United States Patent [19]

Johnson

[11] 4,253,166
[45] Feb. 24, 1981

[54] TARGET LOCATION SYSTEMS

[75] Inventor: Phillip L. M. Johnson, Yeovil Marsh, Nr. Yeovil, England

[73] Assignee: Plessey Handel und Investments AG, Switzerland

[21] Appl. No.: 29,521

[22] Filed: Apr. 12, 1979

[30] Foreign Application Priority Data

Apr. 14, 1978 [GB] United Kingdom ............... 14692/78

[51] Int. Cl.³ ......................... G01S 15/06; G01S 13/06
[52] U.S. Cl. ................................ 367/102; 343/16 R; 343/17.2 PC; 367/117
[58] Field of Search .................. 343/16 R, 17.2 PC; 367/101, 102, 117

[56] References Cited

U.S. PATENT DOCUMENTS

| | | | |
|---|---|---|---|
| 3,517,389 | 6/1970 | Dausin | 343/17.2 R X |
| 3,798,645 | 3/1974 | Baurle et al. | 343/16 R X |
| 3,924,236 | 12/1975 | Earp et al. | 343/16 R |

Primary Examiner—T. H. Tubbesing
Attorney, Agent, or Firm—Fleit & Jacobson

[57] ABSTRACT

A target location system comprising a signal transmitter including a pair of signal transmitter transducers arranged in spaced apart relationship and means for driving the transducers with transmitter pulse signals at the frequencies Fo and Fo+Fb respectively which are arranged to increase progressively in frequency during each pulse to Fo+Δf and Fo+Fb+Δf respectively where Δf is equal to or less than Fb, and an echo signal receiver comprising receiving transducer means feeding a filter bank, the filter bank comprising a plurality of filters which cover in aggregate a predetermined frequency band, each filter being adapted to cover one slot or section of the band whereby the bearing of a target from which an echo signal of a transmitter pulse signal is received, is indicated in accordance with the slot or slots in which the echo signal is received.

7 Claims, 1 Drawing Figure

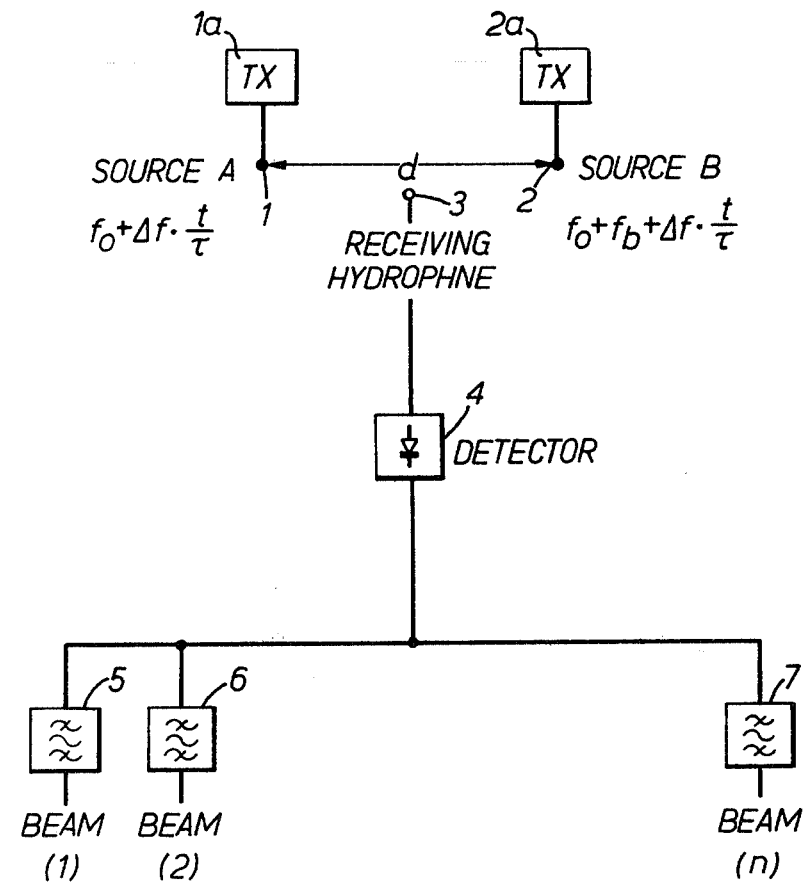

TARGET LOCATION SYSTEMS

IMPROVEMENTS IN OR RELATING TO TARGET LOCATION SYSTEMS

This invention relates to target location systems.

The term "target location" is intended to be construed broadly in the present context so as to include navigations system and may relate to radar or sonar applications.

In order to determine a target bearing by known sonar techniques a beam forming system is required using a large array and relatively complex phase shift or time delay networks. Similar considerations apply to corresponding radar systems.

According to the present invention a target location system comprises a signal transmitter including a pair of signal transmitter transducers arranaged in spaced apart relationship and means for driving the transducers with transmitter pulse signals at the frequencies Fo and Fo+Fb respectively which are arranged to increase progressively in frequency during each pulse to Fo+$\Delta$f and Fo+Fb+$\Delta$f respectively where $\Delta$f is equal to or less than Fb, and an echo signal receiver comprising receiving transducer means feeding a filter bank, the filter bank comprising a plurality of filters which cover in aggregate a predetermined frequency band, each filter being adapted to cover one slot or section of the band whereby the bearing of a target from which an echo signal of a transmitter pulse signal is received, is indicated in accordance with the slot or slots in which the echo signal is received.

The foregoing arrangement relies on the detection of a difference frequency produced due to mixing of two frequencies which are coincident with the target, the difference between the frequencies being dependent upon bearing. However the receiving transducer may be arranged to feed a filter bank via an envelope detector so that the modulation produced by the mixing process is detected. Some exemplary embodiments of the invention will now be described by way of example with reference to the accompanying drawings in which:

The FIGURE is a generally schematic block diagram of a sonar system comprising a transmitter (not shown) arranged to feed a pair of transmitting transducers 1, 2, spaced apart by a disance d and fed from transmitters 1a and 2a, respectively. The transducer 1 is fed from transmitter 1a with a signal which increases from Fo to Fo+$\Delta$f during the transmission pulse and the transducer 2 is fed from transmitter 1b with a signal which increases from a frequency of Fo+Fb to Fo+Fb+$\Delta$f during the transmission pulse. Conveniently the frequency increase is arranged to be linear during the duration of the transmission pulse. Echo signals received from a target are fed via a receiving transducer 3 and an envelope detector 4 to a filterbank comprising filters 5, 6 & 7 only three of which are shown. It can be seen that the frequency of any received echo signal will be indicative of the bearing of the target from which it is received, the bearing being calculated with respect to a line through the transmitting transducers 1 and 2. The filter bank is arranged so that adjacent filters cover adjacent frequency slots so that the bearing of the target is indicated in accordance with which of the filters passes a received echo signal. The foregoing system which includes the envelope detector 4 might be described as a linear system but alternatively the detector 4 may be ommitted and signals may be passed directly from the receiving transducer to the filter bank. This latter arrangement might be described as a non-linear system since non-linear elements in the transmission medium are relied upon to produce a difference frequency. The two transmitting transducers are separated by a distance d and transmit simultaneously a pulse of frequency modulated carrier. The rate of change of frequency within the pulse for both transmitters is the same for each. The carrier frequencies for the two transmitters are separated by at least the total frequency deviation. An observer or a target at some bearing $\theta$ receives components related to (a) the sum of the two signals and (b) due to the non-linear nature of the medium through which signals are transmitted, the product of the two signals. These sum and product effects produce frequency components that are directly related to the acoustic path difference between the two sources resulting from the steer angle $\theta$. Beam identification is therefore achieved in dependence upon the frequency. The non linear system, although having a low conversion efficiency, may suffer lower absorption due to the carrier suppression and therefore have an improved range performance.

Consider the two source frequencies.

$$f_A = f_o + f.t/\tau \tag{1}$$

$$f_B = f_o + f_b + \Delta f.t/\tau \tag{2}$$

The instantaneous phases of these two frequencies are:

$$\phi_A = (f_o t + \Delta f.t^2 + \text{Constant})2\pi \tag{3}$$

$$\phi_B = ((f_o + f_b)(t - t') + \Delta f.(t - t')^2/2\tau + \text{Constant}) 2\pi \tag{4}$$

If the signals corresponding to these phases are added within the medium and the receiving transducer is an energy detector (i.e. phase insensitive), or an energy detector or envelope detector follows a linear transducer or hydrophone, the output signal phase corresponds to the difference in $\phi_A$ and $\phi_B$.

$$\phi_A - \phi_B = (f_b + f_o)t' + \Delta f(2t - t')2\pi \tag{5}$$

i.e. output frequency (=rate of change of phase)=

$$f_b + \Delta f.t' \tag{6}$$

The value of t' is a function of bearing $\theta$ i.e. $t' = d/c \sin \theta$ therefore output frequency is $$f_b + \Delta f.d/c \sin \theta$$

where $\tau$=pulse length.

Now since the pulse is of length the spread of freqencies is $1/\tau$. The resolution is therefore limited to a band of $2/\tau$ Hz (the factor of 2 results from the energy detector). therefore angular resolution =

$$C/\Delta f.d \text{ radians}$$

In a non linear case the received signal will be composed of the instantaneous sum and difference frequencies and a single hydrophone is all that is required to receive the information. The output frequency for a target at bearing $\theta$ is given by $$f = f_b + \Delta f \cdot d/C \sin \theta$$

and due to the spread of frequencies found within a pulse of length the resolution is limited to $C/2\Delta f \cdot 1/d$ radians. The non-linear approach gives a higher resolution than the conventional system at the expense of conversion efficiency.

In both systems the outputs are fed into a bank of overlapping beam identifying filters, the characteristics of which may be used to shape the beam patterns thereby reducing sidelobes. The output from each filter represents one beam and since each beam is sampled independently a parallel system has been achieved.

The advantage of this system over conventional system are two fold (i) cost
(ii) simplicity Since only two sources and one hydrophone are used a considerable saving is made in the hardware.

The linear case discussed first may also be used in radar and radio navigation, such as, for example, a guidance system for aircraft landing equipment.

What we claim is:

1. A target location system comprising a signal transmitter including a pair of signal transmitter transducers arranged in spaced apart relationship, means for driving the transducers with transmitter pulse signals at the frequencies Fo and Fo+Fb respectively which are arranged to increase progressively in frequency during each pulse to Fo+$\Delta$f and Fo+Fb+$\Delta$f respectively, where $\Delta$f is equal to or less than Fb, and an echo signal receiver comprising receiving transducer means feeding a filter bank the filter bank comprising a plurality of filters which cover in aggregate a predetermined frequency band, each filter being adapted to cover one slot, or section of the band whereby the bearing of a target from which an echo signal of the transmitter pulse signal is received is indicated in accordance with the slot or slots in which the echo signal is received.

2. A target location system as claimed in claim 1 wherein the transducers are arranged to feed the filter bank via an envelope detector.

3. A target location system as claimed in any one of claims 1 and 2, wherein the signal transmitter transducers are adapted for sonar applications.

4. A target location system as claimed in any one of claims 1 and 2 wherein the signal transmitter transducers are adapted for use in a radar system.

5. A target location system comprising a signal transmitter including a pair of signal transmitter transducers arranged in spaced apart relationship, means for driving the transducers with transmitter pulse signals at the frequencies Fo and Fo+Fb, respectively, which are arranged to increase progressively in frequency during each pulse to Fo+$\Delta$f and Fo+Fb+$\Delta$f, respectively, where $\Delta$f is equal to or less than Fb, and an echo signal receiver comprising receiving transducer means feeding frequency detector means operative to provide an indication of a target bearing in dependence upon the difference frequency between transmitted pulses reflected contemporaneously from the target to the receiving transducer means.

6. A target location system as claimed in claim 5, wherein the signal transmitter transducers are adapted for sonar applications.

7. A target location system as claimed in any one of claims 5 and 6, wherein the signal transmitter transducers are adapted for use in a radar system.

* * * * *